United States Patent [19]
Bowers, Jr.

[11] Patent Number: 5,899,408
[45] Date of Patent: May 4, 1999

[54] ORNITHOPTER

[76] Inventor: Kenneth R. Bowers, Jr., 2346 E. Orangewood Ave., Phoenix, Ariz. 85020

[21] Appl. No.: 08/826,996

[22] Filed: Apr. 14, 1997

[51] Int. Cl.$^6$ .................................................. B64C 33/02
[52] U.S. Cl. ............................... 244/11; 244/22; 244/72; 416/79
[58] Field of Search .................................. 244/11, 22, 72; 416/79, 82

[56] References Cited

U.S. PATENT DOCUMENTS

| | | |
|---|---|---|
| 986,364 | 3/1911 | Compton . |
| 1,014,857 | 1/1912 | Seifert ........................................ 244/22 |
| 1,211,131 | 1/1917 | Furneaux .................................... 244/22 |
| 1,338,025 | 4/1920 | Lind .......................................... 244/72 |
| 1,412,346 | 4/1922 | Goldschmidt .............................. 244/72 |
| 1,514,046 | 11/1924 | Hinkly ....................................... 244/22 |
| 1,739,630 | 12/1929 | Stelzer ....................................... 244/22 |
| 1,744,080 | 1/1930 | Prosdocimi . |
| 1,810,114 | 6/1931 | Smyth ........................................ 244/22 |
| 2,418,569 | 4/1947 | Baumann . |
| 4,712,749 | 12/1987 | Fox . |

FOREIGN PATENT DOCUMENTS

| | | | |
|---|---|---|---|
| 710005 | 1/1931 | France ....................................... 244/72 |
| 211607 | 3/1908 | Germany ................................... 244/22 |
| 3336 | 4/1904 | United Kingdom ...................... 244/20 |
| 1523902 | 9/1978 | United Kingdom ...................... 244/72 |

*Primary Examiner*—Charles T. Jordan
*Assistant Examiner*—Tien Dinh

[57] ABSTRACT

An ornithopter aircraft which flys by flapping a wing. The wing is flapped by a constructively sympathetically forced dampened harmonic oscillation induced in a leading edge strut which preferable is a single flexible steel rod extending the length of the wing. The wing releases the air on its upward recovery stroke by means of flexible flaps which uncover holes in a structural flexible web forming the wing. On the downward power stroke of the wing, the flaps sealingly abut and occlude the holes of the web, forming a wing surface relatively impermeable to the passage of air. An inner section of the wing, on both sides of the aircraft, where relatively little flapping motion displacement occurs, has a flexible layer which permanently covers and seals the holes of the web. This area of the wing generates lift during both upward and downward motion of the wing, due to the forward motion of the ornithopter and due to the capture of pressurized air from the downstroke of the wing.

3 Claims, 4 Drawing Sheets

ORNITHOPTER

This invention relates to ornithopters, which are airplanes which fly by flapping wings.

For many years, the search for human flight included ornithopters, but this activity largely ended after the Wright brothers flew a fixed wing machine at Kitty Hawk. Despite the subsequent rapid success of fixed and rotary wing airplanes, ornthopter flight should still be pursued because such a craft would have a combination of characteristics not shared by other flying machines namely, high energy efficiency, slow speed, and astounding maneuverability. An ornithopter will be especially suited for sport aircraft.

No one has yet made a successful ornithopter for human flight. This failure is due to several factors: In most cases, the mechanical structure proposed to support and impel the wing is cumbersome and heavy. Many seek to power the ornithopter by human muscles. Some do not provide for positive flight control. Finally, many flapping wing designs do not generate significant lift because a fundamental aerodynamic problem of flapping wings is not recognized or solved.

Consequently, it is an object of this invention to provide a new ornithopter which will achieve safe and controlled flight.

SUMMARY OF THE INVENTION

The invention is an ornithopter having features intended to solve the problems which have prevented success in the past.

This ornithopter is not powered by human muscles, but rather has a gasoline engine having a low ratio of its weight to its output horsepower. (Such engines are recently developed for applications in which the low ratio is critical, such as human portable chain saws.)

This invention has conventional control surfaces (A tail surface having three degrees of freedom and a front mounted canard.)

The failure of many past ornithopters is due to a low generation of lift, because aerodynamic forces in opposition to flight, defined herein as "upsweep drag," are generated by recovery of the flapping wing during its upsweep. The flapping wing of this invention alters itself automatically during flapping to eliminate upsweep drag. The wing is a composite of three layers of flexible material; an open net which allows free passage of air, a second layer of sailcloth which alternately covers the net and occludes its holes during downstroke and uncovers the net during upstroke of the wing; and a third layer of sailcloth permanently abutted to the net in an inner region near the fuselage. The second layer comprises a plurality of panels or flaps attached to and depending from the net.

During downstroke, the second layer, abutted to and occluding the net, thrusts air downward and rearward, generating lift and forward thrust. During wing upstroke, the second layer is swept away from the net, uncovering the net holes to freely pass air, thereby avoiding the thrust of air upward and forward which would occur if the net was occluded. (In past ornithopters, these upsweep drag forces effectively equal and cancel the lift and thrust of the downward stroke, resulting in very little or no net lift.)

The third layer, in the region of the wing near the fuselage, captures air swept under the wing during downstroke to generate lift. This lift persists throughout the flapping cycle.

Engine power is transmitted to a leading edge strut of the flapping wing. This strut is a single, relatively flexible steel or aluminum rod which forms the leading edge of the entire wing as extended to the right and left sides of the aircraft. The strut is seized at two locations by a brace inside the fuselage. The brace moves up and down, impelling a flapping motion in the wing by constructive forcing of a dampened harmonic oscillation in the leading edge strut to which the flexible wing net is attached.

DETAILED DESCRIPTION

Figure 1:
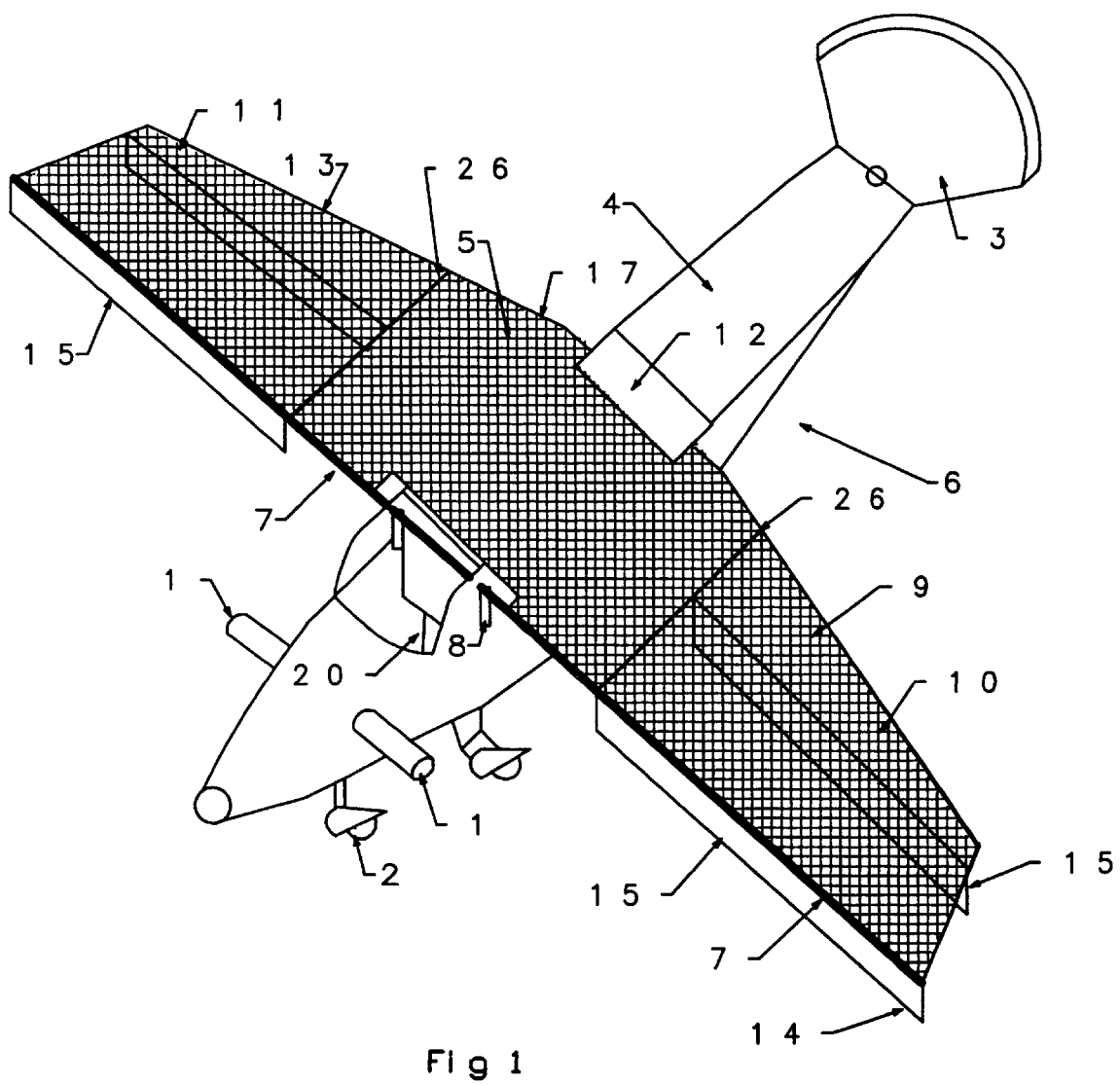
FIG. 1 is a perspective view of the invention with a net having square or rectangular holes.

Considering first the general features of the invention, refer to FIG. 1. Ornithopter 6 has a conventional canard 1 which is used for roll and pitch control, and which may generate some lift. At the rear of ornithopter 6 is a delta shaped tail 3 having three degrees of freedom to enable control of both pitch and roll. Turns are done by coordinated movement of canard 1 and tail 3. Ornithopter 6 is shown with a tricycle landing gear 2 but could also have conventional gear or struts. There is no propeller. The position of wing 5 as shown is of the high wing variety but could be mounted lower on fuselage 4 to be a mid or a low wing design. Since wing 5 flaps up and down, it seems a high wing arrangement is best to provide for maximum ground clearance with the shortest landing gear.

Figure 8:
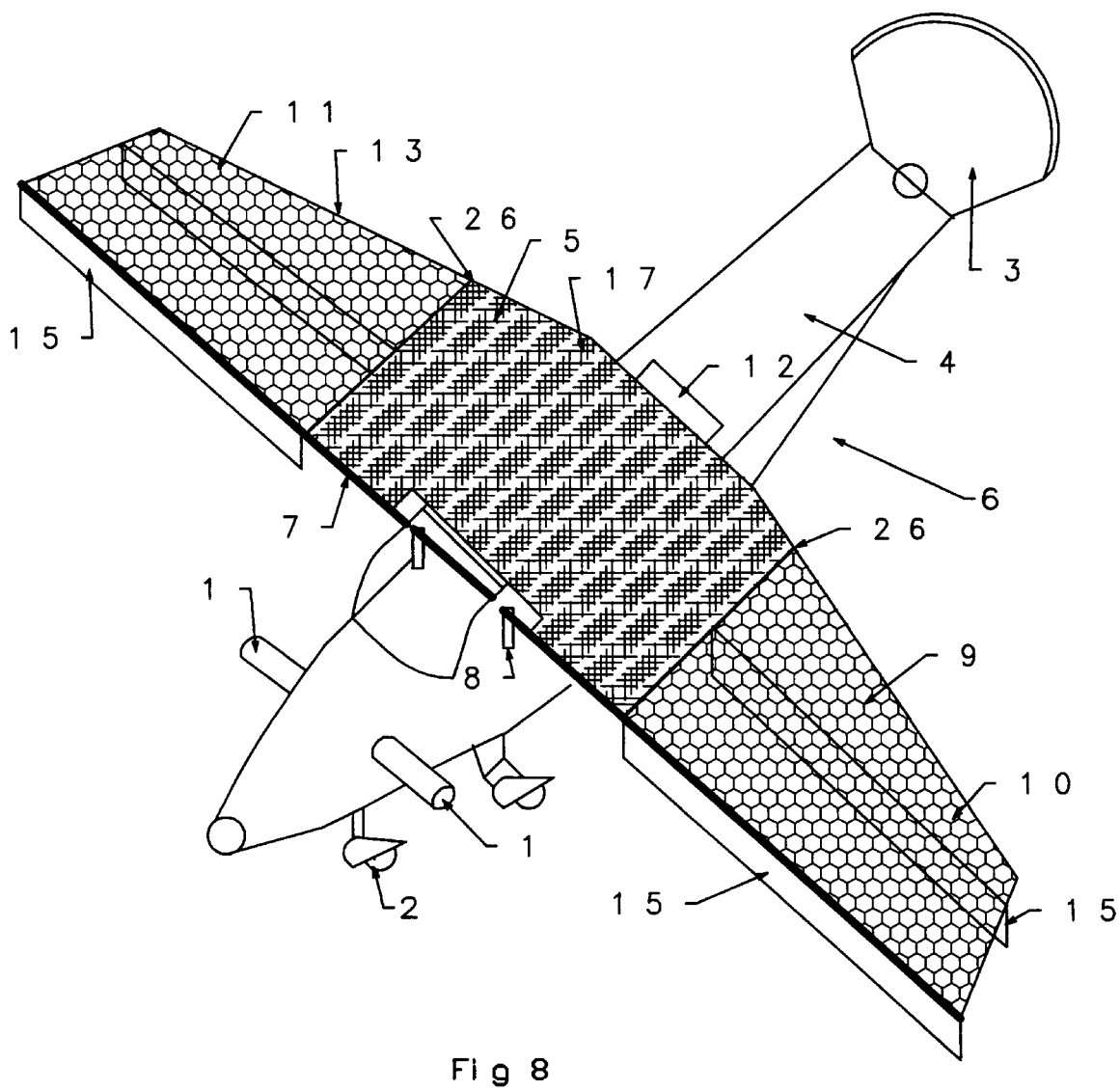
FIG. 8 is a perspective view of the invention with a net having hexagonal holes and having a net cover integral with the wing.

Ornithopter 6 has a single wing 5 which extends to both sides of the craft. At the front or leading edge of wing 5 is a steel rod defined herein as leading edge strut 7. Strut 7 is intended to be a single integral rod, to provide for safety and simplicity, but could be formed of connected sections. Strut 7 penetrates fuselage 4 at two elongated slots 8. A net 9 is attached to strut 7 along the length of strut 7. The means of attachment is not indicated in FIG. 1, but may be by clamps or by knotted cords. Net 9 is fixed to fuselage 4 by a clamp 12 at the rear trailing edge of wing 5. Net 9 may be fabricated of nylon cord 10, which is interwoven to form net 9. As depicted in FIG. 1, net 9 has relatively small square or rectangular holes 11 formed by the pattern of cords 10. Holes 11 may be approximately one inch on a side but are shown bigger in the Figures for clarity. Net 9 may also be fabricated of plastic film formed into a network, in which case, holes 11 may be circular or otherwise shaped. FIG. 8 shows a net 9 with hexagonal holes 11. The heavy lines 26 in FIGS. 1 and 8 are the borders of the second layer 17 where attachment to net 9 occurs. Net 9, in FIG. 1, is above net cover 17 and so is visible above net cover 17 in the region near the fuselage 4. In FIG. 8, net cover 17 is joined to net 9 at borders 26 and forms the inner section of wing 5. Net 9 in this modification does not extend between borders 26.

Figure 5:
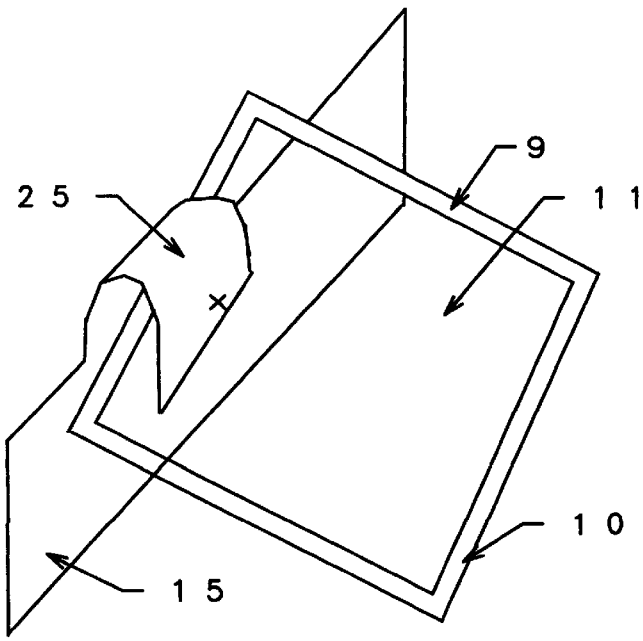
FIG. 5 is a schematic of a section of the wing showing how the flaps may be attached to the net.

In FIGS. 1 and 8, flaps 15 are visible below net 9 in the portion of wing 5 which extends beyond borders 26 on both sides because you can see through nets 9. FIGS. 1 and 8 show only two flaps 15 per side to improve the clarity of the Figures, but in practice more flaps are needed to provide for complete coverage of net 9 during downstroke. Many of the flaps 15 which are not shown may be fitted to match the shape and contours of net 9 when abutted thereto on the downstroke FIG. 5 shows how flaps 15 may be attached to net 9. At intervals along the edge of flap 15, flap 15 is cut to fit through the mesh of net 9 and a portion 25 of flap 15 is folded through hole 11 of net 9 back in abutment with itself. The flap portion 25 can then be stapled or sewn to itself, capturing net 9 in the fold. The "X" in FIG. 5 represents a staple or a sewed stitch. A plurality of such folds 25 serves to attach flap 15 to net 9.

The following will describe how ornithopter 6 generates lift on the downward flap of wing 5 by "seizing the air" and recovers with an upward flap without generating forces opposed to flight ("upsweep drags") by "releasing the air". Net 9 allows unrestricted air flow through holes 11. At various locations 14 from the front leading edge strut 7 to the trailing edge 13, a plurality of sailcloth flaps 15 are attached to net 9. Flaps 15 depend downward from lower surface 16 of net 9 and extend along the length of wing 5, from the outer-most ends of strut 7 inward about two-thirds of the distance to fuselage 4, to borders 26, on both sides of ornithopter 6. The inner one-third of wing 5 on both sides does not have flaps 15. As shown in FIG. 1, net 9, on its lower surface in the inner one-third near fuselage 4, is covered by a layer of sailcloth defined as net cover 17. Net cover 17 extends between borders 26, and always covers and occludes all holes 11 in net 9 which are in the inner one third of wing 5.

Figure 2:
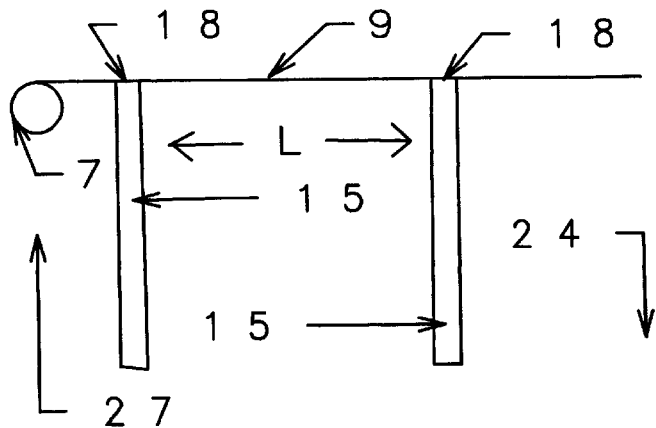
FIG. 2 is a schematic of a section of the wing as orientated during upstroke of the wing.
Figure 3:
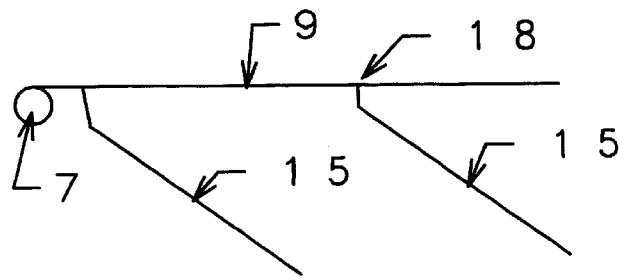
FIG. 3 is a schematic of a section of the wing as orientated during transition from upstroke to downstroke.
Figure 4:
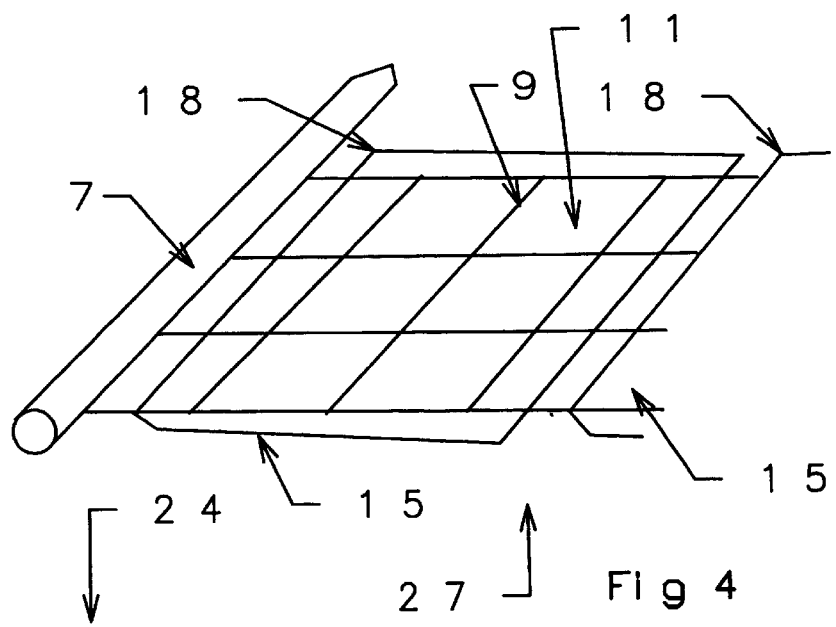
FIG. 4 is a schematic of a section of the wing as orientated during downstroke of the wing.

Refer to FIGS. 2, 3 and 4. When wing 5 in moving upward (in the direction of arrow 27 in FIG. 2), the airflow through holes 11 is in the direction of arrow 24 and causes flaps 15 to extend away from net 9 as shown in FIG. 2. Holes 11 are uncovered, air flows through holes 11, and wing 5 does not generate a differential pressure across its upper and lower surface. Hereinafter, this is described as "releasing the air". The purpose of releasing air is to avoid upsweep drag. When wing 5 is moving downward as shown in FIG. 4 by arrow 24, the initial air flow through holes 11 in the direction of arrow 27 and causes flaps 15 to snap snug against net 9, covering and occluding holes 11. Flaps 15 are of sufficient length L to just reach or overlap the point of attachment 18 of the next adjacent flap 15. For clarity in FIG. 4, a gap is shown between adjacent flaps 15. The plurality of flaps 15 suffice to cover the entire net 9 exclusive of net 9 in the region of net cover 17, such that substantially all holes 11 of net 9 become covered and occluded and wing 5 becomes impermeable to air flow. Hereinafter, this is defined as "seizing the air". Wing 5 will generate a differential pressure between its upper and lower surfaces in this seized configuration due to both downward movement of wing 5 and forward movement of ornithopter 6. FIG. 3 shows the position of flaps 15 during transition between covering and uncovering net 9.

During oscillation of strut 7, the ends of strut 7 move a relatively long distance while the center approximately one-third of the rod moves very little. Consequently, the area of wing 5 covered by net cover 17 experiences very little displacement during a flapping cycle and does not generate significant upsweep drag. Here, net 9 holes 11 need not be uncovered during the flap cycle to minimize upsweep drag, so this region has net cover 17 instead of flaps 15. Alternatively, the entire wing 5 may be fabricated using flaps 15 and net 9, omitting net cover 17, or the length of net cover 17 may be less or more than one-third of the length of strut 7 as found to be best.

Figure 6:
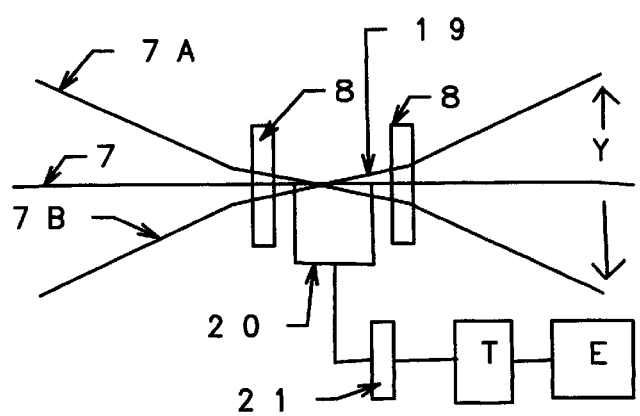
FIG. 6 is a schematic of the leading edge strut and its connections to the engine.
Figure 7:
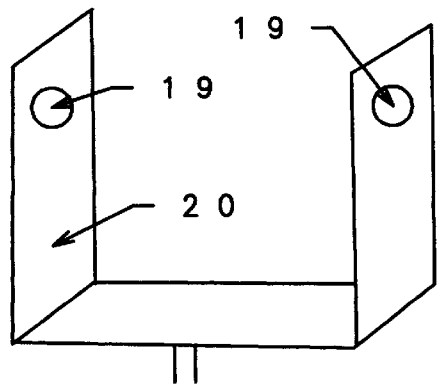
FIG. 7 is a schematic of the brace which attaches to the leading edge strut.

Refer to FIG. 6. This Figure is a schematic showing how wing 5 is made to flap. Strut 7 is shown undeflected as strut 7, deflected upward as strut 7A, and deflected downward as strut 7B. Strut 7 is seized at two points 19 by a brace 20, which is also shown in FIGS. 1, 6, and 7. Brace 20 is omitted from FIG. 8 for clarity.) Brace 20 is attached to a wheel 21 driven by a transmission T which is powered by a gasoline engine E. Brace 20 is rigidly attached to and supports strut 7 at two points 19. Strut 7 passes through fuselage 4 through elongated holes 8. Brace 20 is attached to a wheel 21. Rotation of wheel 21 causes brace 20 to move up and down, thereby moving strut 7 up and down in harmonic oscillation. Seizure of strut 7 at two points by brace 20 is important to the character of the oscillation and the strength of the structure. Brace 20 induces a forced constructively sympathetically dampened harmonic oscillation in strut 7 at a frequency which is a function of the length of strut 7. Transmission T is of the fluid coupled type and is geared to convert the speed of engine E to the natural frequency of strut 7. The forces of lift and drag on wing 5 tend to dampen the motion of strut 7, but the engine force applied to strut 7 in sympathy with the harmonic oscillation of strut 7 causes strut 7 to maintain an oscillation of a fixed amplitude and frequency. By proper choice of the power of engine E and the length of strut 7, an amplitude of oscillation of wing 5 which does not result in ground strikes, and a frequency which generates sufficient lift can be achieved. As a target, four to six cycles per second are considered the best flap rate with a wing 5 tip displacement amplitude of six feet.

The force applied to strut 7 by brace 20 is said to be constructive because it increases the amplitude of the oscillation. The force applied to strut 7 is said to be sympathetic because it is in phase with the natural frequency of strut 7. The amplitude of the oscillation increases until the forces which dampen the oscillation just match the applied engine force. Both ends of strut 7 oscillate upward and downward together in phase and with the same amplitude.

The forces of lift on wing 5 are reacted to fuselage 4 by brace 20 and clamp 12.

Since wing 5 is constructed of flexible net and sailcloth, it may be found desirable to influence the shape of wing 5 and flaps 15 by attachment of semi-rigid straps or stakes at selected locations, especially at the ends of flaps 15.

The operation of ornithopter 6 can be easily understood by reference to the Figures with the following description. When ornithopter 6 is at rest, flaps 15 depend downward. When engine E is started and power is applied to wheel 21 via transmission T, wheel 21 begins to rotate and brace 20 begins to move up and down. It is found that the amplitude of movement of brace 20 and strut 7 at points 19 need be only a few inches to correspond to full movement Y of the ends of strut 7. Movement of strut 7 at the points of passage through fuselage 4 is allowed freely by elongated holes 8 through fuselage 4. Brace 20 begins to induce a harmonic oscillation in strut 7 which increases in amplitude. Flaps 15 snap open and closed over holes 11 in net 9. During the upward stroke of wing 5, flaps 15 uncover holes 11 and wing 5 does not seize the air. (No upsweep drag is generated). During the downward stroke of wing 5, flaps 15 sealingly cover and occlude holes 11 and wing 5 seizes the air, driving air downward and backward. During the downward stroke, a wave of compressed air is swept under net cover 17, producing lift that persists there during the upward recovery stroke of wing 5. Since net 9 and net cover 17 are attached to strut 7 and clamp 20, the large area between these two attachment locations is free to bulge upward, forming a large lift pocket filled with air pressurized by the downstroke of wing 5.

The action of flaps 15 is automatic and does not require any pilot attention or control. No complex mechanism is required; the action is entirely induced and controlled by aerodynamic and inertial forces on wing 5.

Flaps 15 will be bent backward toward the trailing edge 13 of wing 5 by the flow of air due to the forward motion of ornithopter 6, as shown in FIG. 3. This inclination rearward is not overcome by forward movement of ornithopter 6 because the speed of flapping exceeds the speed of forward movement. The rearward inclination will prevent flaps 15 from bending the wrong way during downstroke. During takeoff and landing, ornithopter 6 will be faced into the wind to produce the same result. If there is no wind, it must be expected that occasionally flaps 15 will bend forward rather than backward. This should prove to be of little consequence since only one flap width of holes 11 will be uncovered and the situation should correct itself at the next flap cycle.

When engine operation ceases, the oscillation of strut 7 will stop. Ornithopter 6 then becomes operational as a glider.

FIGS. 1 and 8 depict a specimen of this invention adapted for sport. Its gross weight should be approximately four hundred pounds, requiring an engine of about twelve horsepower.

Ornithopter 6 should be capable of vertical takeoff and landing. Inverted flight will not occur because ornithopter 6 rights itself, if turned upside down, at the next flap. (The reason for this is not understood.)

In the claims and in this specification, the singular word "wing" means the entire structure generating lift on both the right and left sides of the aircraft. It is recognized that others consider this to be two wings, but the singular is used herein because in this mode of the invention, a single integral strut 7 and a single integral net 9 are used to form wing 5.

The terms "constructively sympathetically forced dampened harmonic oscillation" each have the meanings common to the physical sciences or that meaning defined herein.

While the above description is the best presently contemplated embodiment, it is clear that various modifications may be envisioned without departure from the scope of this invention. As an example, the wing could be flapped by a mechanism other than a harmonically oscillating strut. Also, the flaps could be more numerous and could be integral to a fabric layer deployed on the net. The net could be replaced by cords deployed on this fabric layer to capture a flap. (This mode has been tested and rejected in favor of the disclosed best mode). Therefore, the claims should be interpreted broadly.

I claim:

1. A method for flapping an ornithopter wing, said wing being herein defined as extending across and beyond both sides of said ornithopter fuselage thereby encompassing what is elsewhere considered two wings, said wing having an elongated strut extending substantially the entire length of said wing, which method comprises:

a) seizing said strut by impelling means at a position approximately in the center of said strut, and b) sympathetically impelling in said strut extending on both sides of the ornithopter a harmonic oscillation by constructive movement of said impelling means, thereby c) flapping said wing with each end of said wing moving in phase with and with the amplitude of the opposite end, this being a characteristic of harmonic motion in said strut.

2. The ornithopter of claim 1 wherein said strut is the leading edge member of said wing.

3. The ornithopter of claim 1 wherein said strut is seized at two locations by said means to induce in said strut a constructively sympathetically forced harmonic oscillation for flapping said wing.

* * * * *